Sept. 14, 1926.

A. P. HODGE 1,599,528

SPRING DRIVEN MOTOR

Filed Nov. 3, 1924

INVENTOR
A. P. HODGE
BY
Bartlett Brownell
ATTORNEYS

Patented Sept. 14, 1926.

1,599,528

UNITED STATES PATENT OFFICE.

ALBERT P. HODGE, OF WINSTED, CONNECTICUT, ASSIGNOR TO WILLIAM L. GILBERT CLOCK COMPANY, OF WINSTED, CONNECTICUT, A CORPORATION OF CONNECTICUT.

SPRING-DRIVEN MOTOR.

Application filed November 3, 1924. Serial No. 747,459.

My invention relates to spring driven motors such as motors for clocks and the like, where it is desirable to be able to replace a broken spring without disassembling the mechanism of the motor as a whole and has for its object to provide a new and improved means for accomplishing this result without disturbing the adjustment of the parts of the train other than the spring arbor and members carried thereby. It further has for its object to provide novel means for securing a spring end and arbor bearings.

In clocks as ordinarily made at present, it has been necessary when making any repairs that necessitated the removal of the main wheel, arbor or spring, to take the movement apart as a whole and then after making the repairs to reassemble all the parts and re-adjust, as in re-assembling all parts would not be in exactly the same adjustment as they were previously. Such disassembling and re-assembling and adjustment calls for the expenditure of considerable time by a skilled employee and the corresponding expense which expenditure of time and expense it is the object of my invention to substantially eliminate in a simple manner. The following is a description of an embodiment of my invention reference being had to the accompanying drawings, in which,—

Fig. 2 is a section on the line 2—2 of Fig. 1; while

Figure 1:
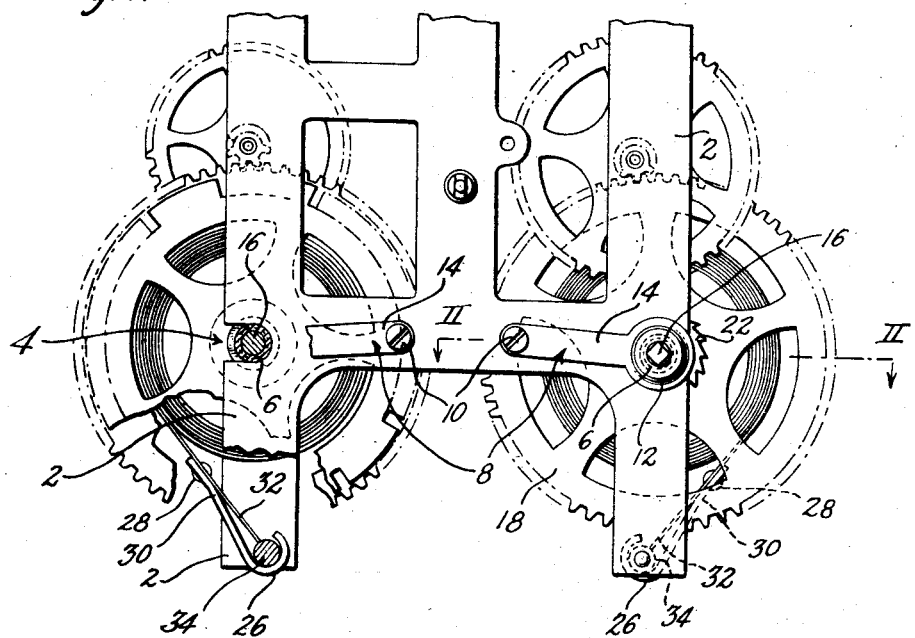
Figure 1 shows parts of a spring driven motor having two main spring arbors and springs and embodying my invention in connection with each of said arbors.
Figure 2:
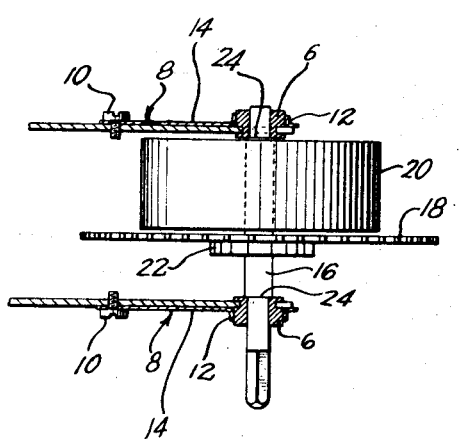
Figure 3:
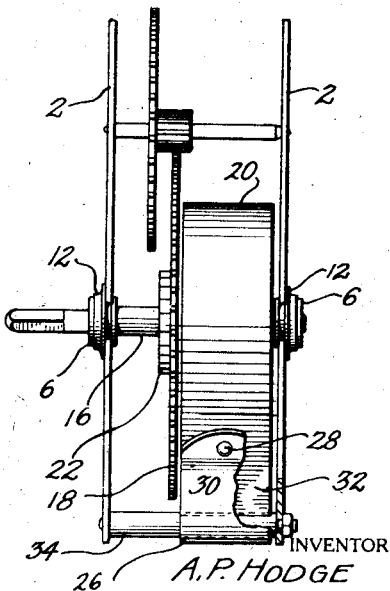
Fig. 3 is a right hand side elevation of the mechanism shown in Fig. 1, parts being broken away.

Referring more particularly to the drawings, 2—2 are front and rear plates of a spring driven motor. Each plate is provided with a lateral slot 4 extending inwardly from a side of the frame and having parallel sides. Within these slots are bushings 6—6 provided with circumferential grooves of the same width as the thickness of the plates and forming necks of the same diameter as the width of the slots in the plates so that the bushings can be slid in and out of the slots. Since the plates fit the grooves the bushings when within the slots are held from endwise movement. Removably connected to the frames are two bridge members 8—8. These bridge members are secured to the frames by screws 10—10. The bridge members are provided with eyelets 12—12 on which are inwardly extending lateral projections 14—14 approximately parallel with the sides of the grooves 4—4, the screws 10 passing through the ends of said projections. The eyelets 12—12 embrace the round external ends of the bushings 6—6 and thus hold them fixed within the slots 4—4. 16 is a spring arbor carrying the main wheel 18 and the driving spring 20 together with the ratchet wheel 22, these parts except as hereinafter specified being of ordinary construction, and is provided with shoulders 24 engaging the inner faces of the bushings.

The end of each spring is provided with a hook 26 which is riveted to the spring at 28 being bent backward at 30 so that the end 32 of the spring blocks or closes the mouth of the hook sufficiently to retain therein a post such as the pillar 34 of the frame, as shown. The plane of the end portion 32 of the spring is preferably approximately in line with a radius of the post 34, this being attained by the proper bending back of the hook at the point 30.

When it becomes necessary to remove the main arbor, the bridges 8 are removed and the bushings 6—6 are slid sideways through the notches 4—4, the end of the spring being released from the post 34 by depressing the tongue 32 and unhooking. After the repairs, such for instance as the placing on the arbor of a new spring restrained by the ordinary clamp has been carried out, the bushings are applied to the ends of the arbor and are slipped in place whereupon the bridges 8—8 are secured in place, the hook 26 being snapped upon the post 34 and retained thereon by the flexible tongue 32. The spring is then wound up sufficiently to permit removal of the clamp and the repair job is thus completed without disassembling the parts or changing their relation so as to require subsequent adjustment of the mechanism. In the drawings the right hand portion of Fig. 1 shows the parts in front elevation, while the left hand portion of Fig.

1 shows certain parts broken away and a section of the bushing in the plane of the outer surface of the front frame.

The means described constitute a simple and effective means for permitting the removal and replacement of the main spring arbor for repairing any of the parts carried thereby and for accomplishing the objects specified.

The hook is made of heavier stock than the spring and the opening in this hook is slightly larger than the diameter of the pillar. In the preferred form the end of the spring extends toward the hollow of the hook pointing to the center of the pillar or a little beyond the center, leaving a space of substantially the diameter of the pillar so that the hook is firmly held in position at all times by the spring pressing the pillar into the hollow of the hook.

Obviously the hook can be used with other means for removably mounting the arbor, and the means for removably mounting the arbor to be used in connection with other means for detachably securing the end of the spring.

As will be evident to those skilled in the art, my invention permits of various modifications without departing from the spirit thereof or the scope of the appended claims.

What I claim is:—

1. In a spring driven motor a frame having front and rear plates each provided with a lateral slot having parallel faces, bushings within said slots having lateral grooves embracing the sides of said slots, members secured to said plates and located at points adjacent to the inner ends of said slots and surrounding said bushings, so as to hold them fixed within said slots and an arbor passing through said bushings.

2. In a spring driven motor a frame having front and rear plates one of which is provided with a lateral slot having parallel faces, a bushing within said slot having a lateral groove in which the edges of the slot extend and a projecting end, and a perforated member secured to said slotted plate and surrounding said projecting end of said bushing so as to hold said bushing fixed within said slot.

3. In a spring driven motor a frame having front and rear plates each provided with a lateral slot, bushings within said slots having round ends and circumferential grooves embracing the sides of said slots, members secured to said plates and having eyelets engaging the round ends of said bushings so as to hold them fixed within said slots, and an arbor passing through said bushings.

4. In a spring driven motor a frame having front and rear plates each provided with a lateral slot, bushings within said slots having round ends and circumferential grooves embracing the sides of said slots, members having eyelets engaging the round ends of said bushings so as to hold them fixed within said slots, an arbor passing through said bushings, said eyelets having lateral extensions projecting outwardly from the sides of said plates and secured to said plates.

5. In a spring driven motor a frame having a fixed post, a spring carried by an arbor mounted in said frame and parallel to said post and a hook secured adjacent to the end of said spring and embracing said post, said spring being adapted to be unhooked from said post, the end of said spring constituting a flexible tongue having its end spaced away from the rear portion of said hook and holding said hook about said post.

6. In a spring driven motor a frame having a fixed post, a spring carried by an arbor mounted in said frame and parallel to said post and a hook secured adjacent to the ends of said spring and embracing said post, said spring being adapted to be unhooked from said post, the end of said spring constituting a flexible tongue holding said hook about said post, said hooks being bent backward from the plane of the end of said spring so as to bring the plane of said end into approximate alinement with the center of said post.

7. In a spring driven motor a frame having a fixed post, a spring carried by an arbor mounted in said frame and parallel to said post and a hook secured adjacent to the end of said spring and embracing said post, said spring being adapted to be unhooked from said post, the end of said spring constituting a flexible tongue holding said hook about said post, said hooks being bent backward from the plane of the end of said spring so as to bring said plane into approximate alinement with the center of said post, the distance between the end of the spring and the remote surface of the hollow of said hook being substantially equal to the diameter of said post.

ALBERT P. HODGE.